Figure 7:
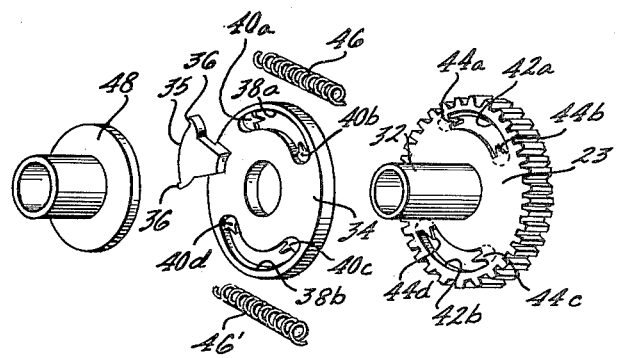

Sept. 14, 1954    M. R. ALEXY    2,688,882
LOW TORQUE, ENERGY ABSORBING, STOPPING DEVICE
Filed July 24, 1951    2 Sheets-Sheet 1
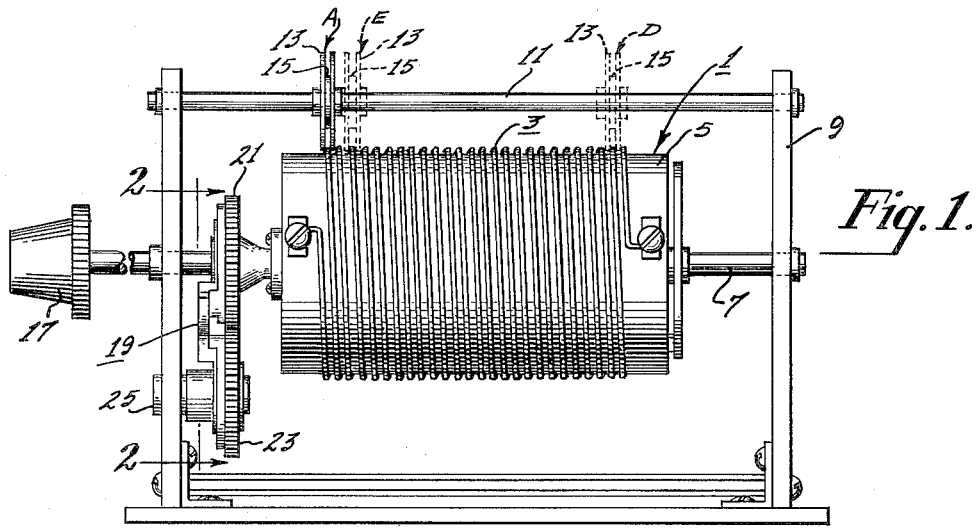
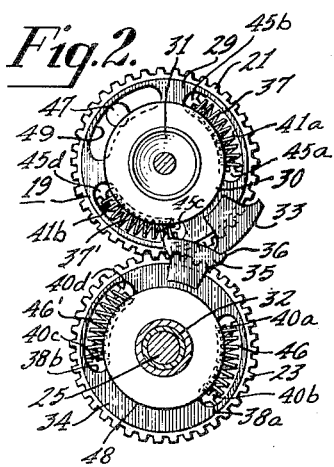
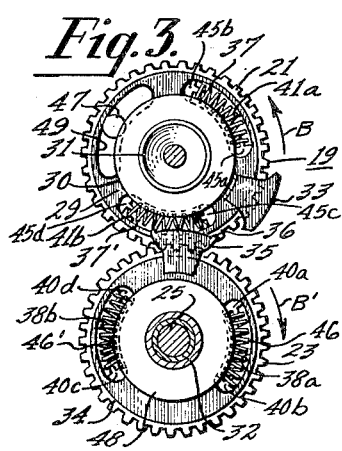
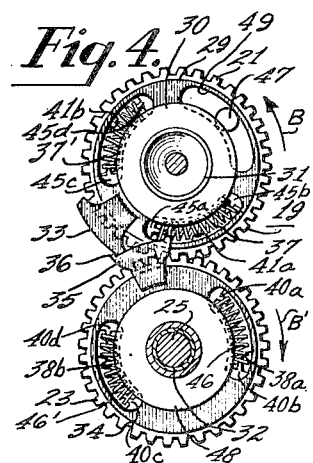
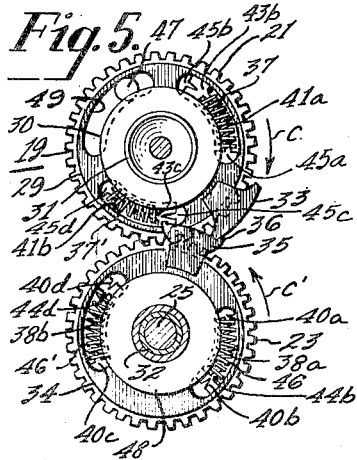
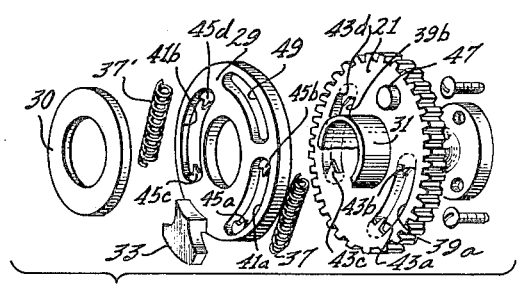
INVENTOR
Matthew R. Alexy
BY
ATTORNEY Patented Sept. 14, 1954

2,688,882

UNITED STATES PATENT OFFICE 2,688,882

LOW TORQUE, ENERGY ABSORBING, STOPPING DEVICE

Matthew R. Alexy, Philadelphia, Pa., assignor to Radio Corporation of America, a corporation of Delaware Application July 24, 1951, Serial No. 238,268

4 Claims. (Cl. 74—414)

The present invention relates to a device for automatically stopping a device at the conclusion of a predetermined number of revolutions of a rotating part.

Although suitable arrangements have been provided heretofore to stop a rotating part within a given number of degrees of rotation, they are not satisfactory for certain types of apparatus. For example, in certain types of radio apparatus designed for remote control operation, an automatic tuning system is employed. This system may include a preselector mechanism wherein a rotatable member is mounted on a shaft and has a finger or follower arranged in contact therewith which is adapted to be moved a predetermined distance linearly when the member is rotated a given number of degrees. In order to confine rotation of the member within a predetermined range, that is, within a given number of degrees rotation, a stop mechanism is required. In certain arrangements of this kind, it is necessary for efficient operation that the stop device operate with a minimum of torque, that the stop device should not bring the rotating mechanism to an abrupt stop, and that the forces involved in stopping the device be kept to a minimum.

A primary object of the present invention is to provide an improved device for automatically stopping rotating mechanisms, which is simple in construction, effective and positive in operation.

Another object of the present invention is to provide an improved, automatic stopping device which will accurately confine movement of a rotatable member within a predetermined range or given number of degrees.

Still another object of the present invention is to provide an improved, automatic stopping device for rotating mechanisms, which device will require only a minimum of torque to operate.

A further object of the present invention is to provide an improved automatic stopping device for a rotating mechanism which will effectively absorb the shock of sudden stopping forces.

It is also an object of the present invention to provide an improved device for automatically stopping rotating mechanisms which is simple in construction and operation and which can be provided at a minimum of cost.

In accordance with the present invention, the automatic stop comprises two members mounted for rotation in opposite directions with respect to each other. Each of the members is provided with complementary locking means resiliently carried thereby to absorb shock incident to stopping. The complementary locking means and rotatable members are arranged to engage in locking position in response to rotation of the members to a predetermined angular position with respect to each other.

The novel features characteristic of the present invention, as well as additional objects and advantages thereof, will be better understood from the following detailed description when read in connection with the accompanying drawing in which:

Figure 1 shows a variable inductor provided with an automatic stopping device in accordance with the present invention, Figure 2 is a section view, slightly enlarged and taken in the direction of the arrows 2—2, of the stopping device shown in Figure 1, the parts being shown in one of two locked positions, Figure 3 is a section view, similar to Figure 2, illustrating the stopping device in a position intermediate to the two locked positions, Figure 4 is a section view, similar to Figure 2, showing the parts in the other of two locked positions, Figure 5 is a section view, similar to Figure 4, showing the parts in a strained position incident to stopping rotative movement, Figure 6 is a perspective, exploded view of one of the pair of rotating members of the stopping device shown in Figures 1 through 5, and Figure 7 is a perspective, exploded view of the other of the pair of rotating members shown in Figures 1 through 5.

Referring more particularly to the drawing, wherein similar reference characters designate corresponding parts throughout, the present invention is shown applied to a variable inductor or tuning coil 1 employed in electrical or radio apparatus. The apparatus shown is but illustrative of the type of apparatus to which the present invention is applicable, and, therefore, the parts shown are only those necessary to permit a complete understanding of the present invention.

The variable inductor comprises, generally, a multi-turn coil of wire 3 wound upon a cylindrical form 5. The form 5 is attached to an axially disposed shaft 7, the ends of which are journaled in a suitable framework or support 9 to allow the coil to be rotated.

A second shaft 11 is mounted on the support in parallel, spaced relation to the coil shaft 7. A follower 13 or other suitable connector is mounted on the second shaft for linear movement thereon. The follower 13 comprises a disc-like element having a circumferential groove 15 extending inwardly from the periphery thereof. The follower is arranged so that the portions thereof forming the groove bridge the coil wire and follow the convolutions of the coil as the coil is rotated by the shaft, in a manner and for a purpose well known in the art. The coil may be rotated for adjustment manually, as by means of a knob 17, or by a motor drive.

In order to prevent the follower 13 from becoming disengaged from the coil 3, as by moving it beyond the ends of the coil, a stop mechanism 19 is provided to limit or confine the rotation of the coil to a predetermined range, that is, within a given number of degrees rotation.

A preferred embodiment of a stop mechanism in accordance with the present invention comprises a gear train consisting of two spur gears 21, 23 in mesh so that they rotate in opposite directions. One of the gears 21 is connected to the shaft 7 so that it is rotatable simultaneously therewith as well as with the coil 3. The other gear 23 is mounted for independent rotation on a separate shaft 25 carried by the support 9 or other suitable support which will maintain the two gears in mesh.

Complementary locking means or stopping elements are carried by the gears 21 and 23. The stopping element carried by the gear 21 comprises an annular disc 29 mounted for sliding rotation on the hub 31 of the gear 21. A locking washer 30, making a tight fit with hub 31, is provided to hold the disc in place. The disc 29 is provided with an extension or foot 33 which projects in a radial direction beyond the periphery of the gear. The other gear 23 is also provided with a hub 32 and an annular disc 34 mounted for sliding rotation about the hub. This disc is also provided with a radial extension 35 somewhat similar in shape to the extension 33. However, the freely disposed end of the extension 35 is provided with a pair of lips or projections 36 at the outer ends thereof to insure positive locking action with the extension 33 which is on the annular disc associated with the other gear in the train.

Upon rotation of the gears to a certain angular relation one to the other, the extensions 33 and 35 will engage in locking position and prevent further rotation of the gears in that particular direction of rotative movement. One of these locked positions is illustrated, for example, by Figure 2 of the drawing. The gears may then be rotated in the opposite direction until they reach an angular relation one to the other such as to engage the extensions 33 and 35 in locked position once again. This last mentioned locked position is illustrated by Figure 4 of the drawing. For some applications, as in the case of the automatic tuner illustrated, it is preferable that the gear ratio be other than unity so that the gears will turn through a plurality of revolutions between one locked position and the other. It is obvious, of course, that the number of revolutions the gears execute in being turned from one locked position to the other is determined by the gear ratio, the diametral pitch of the gear teeth, and the width of the free end of the extensions 33 and 35. In the modification illustrated, the gear 21 has 38 teeth and the gear 23 has 40 teeth. Starting from the position shown in Figure 2 and rotating gear 21 two full revolutions in a counterclockwise direction, there will be a clearance between projections 33 and 35, as shown in Figure 3, because the projection 35 on gear 23 will be displaced a certain angular distance from its original relative position. With successive revolutions the clearance between the projections will increase to a maximum and then decrease until the stops again engage as shown in Figure 4.

The principle of operation of the stop mechanism illustrated in Figures 2 through 4 may be further explained by describing its application to the variable inductor 1 shown in Figure 1. Rotation of the coil 3 is to be confined to a particular range, or within specified limits the follower 13 is to engage the coil. Therefore, it is necessary to design the stop mechanism to stop rotation of the coil at each limit of the range. As seen in Figure 2, the spur gears 21, 23 are disposed in a position such that the complementary extensions 33 and 35 are in a first locked position. With the gears in this first locked position, follower 13 is placed in the position A at the left of the coil range. The gears 21, 23 may then be rotated as in the directions B, B', indicated in Figures 3 and 4, thereby to move the follower along the coil convolutions toward the end of the coil disposed at the right in Figure 1. Rotation of the parts in these directions may be continued until the spur gears reach the angular position shown in Figure 4, at which time the extensions 33, 35 will have engaged again to stop rotation and locate the follower in the position D at the other end of the coil range. It will be observed that intermediate the range limits, the extensions will pass by each other during each revolution. At the end of the second revolution, the follower 13 has been moved a short distance to the right, as to position E in Figure 1.

In order to absorb shock incident to engaging of the locking extensions 33 and 35, both of the gears 21 are provided with a pair of compression springs 37, 37' which are disposed partly within arcuate slots 39a and 39b provided in the gear and partly within complementary slots 41a and 41b provided in the annular disc 29 associated therewith adjacent the peripheries thereof. The springs 37 and 37' are located on opposite sides of the extension 33 to cushion or absorb shock occasioned by stopping forces in either direction of rotative movement. Any suitable means, such as projections 43a, 43b and 43c, 43d extending into the ends of the slots 39a and 39b in the gear 21 and similar projections 45a, 45b and 45c, 45d extending into the ends of the slots 41a and 41b in the annular disc 29 may be employed for engaging and retaining the compression springs in place. In a similar manner, the annular disc 34 is provided with an arcuate slot 38a, having projections 40a and 40b, and a similar slot 38b having projections 40c and 40d. The gear 23 is also provided with an arcuate slot 42a having projections 44a and 44b, and a second arcuate slot 42b, having projections 44c and 44d. Springs 46 and 46' are positioned within the slots 38a, 42a, and 38b, 42b, respectively, and a locking washer 48 making a tight fit on the hub 32 of the gear 23 holds together the assembly of annular disc 34 and gear 23. The locking washer also aids in holding the springs in place. Thus, as shown in Figure 5 of the drawing, when the gears 21, 23 are rotated in the directions C, C' to engage the extensions 33 and 35 in the first locked position, the gears continue to rotate a short distance with respect to the annular discs 29 and 34. Between gear 21 and annular disc 29 the springs 37, 37' are each compressed. The spring 37 is compressed between the projection 45a on the annular disc and projection 43b on the gear. The spring 37' is compressed between projection 45d and 43c. Rotation of gear 23 with respect to annular disc 34 causes spring 46 to be compressed between projection 40a on the annular disc and 44b on the gear. Spring 46' is similarly compressed between projection 40c and 44d. Thus, the kinetic energy of stopping the gears is absorbed by the springs 37 and 37' and by the springs 46 and 46'.

In order to more positively limit rotational movement of the gears with respect to the annular discs, one of the gears 21 is provided with a pin 47 projecting from that side of the gear which faces toward its associated annular disc 29. The pin rides within an arcuate slot 49 which is provided in the annular disc 29. As the gear 21 rotates with respect to its associated annular disc, the springs 37, 37' are compressed until the pin 47 strikes an end of the slot 49.

From the foregoing description it will be apparent that the present invention provides an automatic stop mechanism which requires a minimum of torque to operate since the arrangement is a simple, one-section spur gear train. The forces applied to the stopping elements may be kept to a minimum by providing a gear ratio approximating unity. Abrupt stopping of the elements, which frequently causes parts to break or become damaged, is eliminated by the resilient mounting of the stopping members.

Although there has been shown and described but a single embodiment of the present invention, it will be readily apparent to those persons skilled in the art that various modifications and changes are possible within the spirit of the present invention. For example, gears of types other than spur gears may also be employed, or a gear train of more two gears may be found more suitable provided, however, that the gears carrying the locking members rotate in directions opposite to each other. Other changes of like character will, no doubt, readily suggest themselves to those skilled in the art. Therefore, it is desired that the particular form of the present invention described herein shall be considered as illustrative and not as limiting.

What is claimed is:

1. An energy absorbing stop for arresting motion of a pair of engaging toothed gears without shock when predetermined points on the circumference of each of said gears move into a predetermined corresponding relationship comprising complementary extensions, and resilient couplings connecting said complementary extensions to each of said gears, said extensions being disposed on said gears to initially contact one another when said predetermined points move into said predetermined corresponding relationship with one another, said resilient couplings allowing energy absorbing relative movement between each extension and its associated gear, the extent of said movement being sufficient to allow further engagement of the teeth of said gears before engaging motion of said gears is completely arrested.

2. The combination set forth in claim 1 wherein one of said extensions has projecting lips to provide a positive lock between said extensions when they move into contact with each other.

3. The combination as set forth in claim 1 wherein said resilient couplings are each comprised of a coupling member, one of said extensions being rigidly secured to said coupling member, one of said coupling members being mounted on each of said gears in a manner allowing limited relative movement between said coupling member and said gear, and a resilient member securing said coupling member to said gear in a manner to provide cushioned energy absorption when relative movement between said coupling member and said gear occurs.

4. The combination as set forth in claim 1 wherein said resilient couplings are each comprised of a coupling member, one of said extensions being rigidly secured to said coupling member, one of said coupling members being mounted on each of said gears in a manner allowing a limited relative movement between said coupling member and said gear, arcuate slots being provided in said gear, corresponding arcuate slots being provided in said coupling member, and coil springs being disposed within said arcuate slots, said coil springs resiliently restraining the relative movement of said coupling member with respect to said gear.

References Cited in the file of this patent

UNITED STATES PATENTS

| Number | Name | Date |
| --- | --- | --- |
| 677,784 | Leilich | July 2, 1901 |
| 1,222,699 | Waugh | Apr. 17, 1917 |
| 1,248,811 | Corall | Dec. 4, 1917 |

FOREIGN PATENTS

| Number | Country | Date |
| --- | --- | --- |
| 27,396 | Netherlands | June 16, 1932 |